(12) United States Patent
Liu et al.

(10) Patent No.: US 10,929,086 B2
(45) Date of Patent: Feb. 23, 2021

(54) MULTI-SCREEN DISPLAY APPARATUS AND DISPLAY METHOD THEREOF

(71) Applicant: CHAMP VISION DISPLAY INC., Chu-Nan (TW)

(72) Inventors: Chin-Ku Liu, Chu-Nan (TW); Jhong-Hao Wu, Chu-Nan (TW)

(73) Assignee: CHAMP VISION DISPLAY INC., Chu-Nan (TW)

( * ) Notice: Subject to any disclaimer, the term of this patent is extended or adjusted under 35 U.S.C. 154(b) by 0 days.

(21) Appl. No.: 16/282,338

(22) Filed: Feb. 22, 2019

(65) Prior Publication Data

US 2019/0258444 A1  Aug. 22, 2019

(30) Foreign Application Priority Data

Feb. 22, 2018 (CN) .......................... 201810153832.5

(51) Int. Cl.
G09G 5/00 (2006.01)
G06F 3/14 (2006.01)
G09G 5/14 (2006.01)
G02B 5/04 (2006.01)
G09G 5/373 (2006.01)

(52) U.S. Cl.
CPC ............ *G06F 3/1446* (2013.01); *G02B 5/045* (2013.01); *G09G 5/14* (2013.01); *G09G 5/373* (2013.01); *G09G 2320/0693* (2013.01); *G09G 2354/00* (2013.01)

(58) Field of Classification Search
CPC . G02B 5/09; G02B 5/04; G02B 5/045; G02B 13/0065; G02B 6/0005; G02B 5/201; G02B 6/0035; G02B 6/0043; G02F 1/133308; G02F 1/13336; G02F 1/1336; G06F 3/1446; G09G 2300/023; G09G 2300/026; G09G 3/3406
See application file for complete search history.

(56) References Cited

U.S. PATENT DOCUMENTS 8,330,900 B2   12/2012 Kuo et al.
2010/0277665 A1  11/2010 Kuo et al.
(Continued)

FOREIGN PATENT DOCUMENTS

CN   101416094 A   4/2009
CN   202837794 U   3/2013
(Continued)

*Primary Examiner* — Weiming He

(57) ABSTRACT

A multi-screen display apparatus includes a first display screen, a second display screen and a prismatic structure optical element. The display area of the first display screen includes a first main display area, a first and second sub display areas. The display area of the second display screen includes a second main display area, a third and fourth sub display areas. The fourth sub display area is adjacent to the second sub display area. The first main display area displays the first part of the first image frame. The first and fourth sub display areas display the second part of the first image frame adjacent to the first part. The second main display area displays the first part of the second image frame. The second and third sub display areas display the second part of the second image frame adjacent to the first part. A display method is also provided.

5 Claims, 15 Drawing Sheets

(56) References Cited

U.S. PATENT DOCUMENTS

| | | | |
|---|---|---|---|
| 2011/0164200 A1* | 7/2011 | Watanabe | G02F 1/13336 349/58 |
| 2017/0086308 A1 | 3/2017 | Large et al. | |
| 2018/0040281 A1* | 2/2018 | Liu | G09G 3/20 |

FOREIGN PATENT DOCUMENTS

| | | |
|---|---|---|
| CN | 203644317 U | 6/2014 |
| CN | 104978901 A | 10/2015 |
| CN | 105100658 A | 11/2015 |
| CN | 205485774 U | 8/2016 |
| CN | 106886253 A | 6/2017 |
| TW | 200541334 A | 12/2005 |
| TW | 200846774 A | 12/2008 |
| TW | M358323 U | 6/2009 |
| TW | 200938913 A | 9/2009 |
| TW | I411848 B | 10/2013 |
| TW | 201432351 A | 8/2014 |
| TW | I459182 B | 11/2014 |
| TW | 201513074 A | 4/2015 |
| TW | 201610960 A | 3/2016 |
| TW | 201706976 A | 2/2017 |
| TW | I603305 B | 10/2017 |
| TW | 201805922 A | 2/2018 |
| TW | I642050 B | 11/2018 |

* cited by examiner the image processing module divides the display area of the first display screen into the first main display area, the first sub display area and the second sub display area arranged in sequence and divides the display area of the second display screen into the second main display area, the third sub display area and the fourth sub display area arranged in sequence, wherein the fourth sub display area is adjacent to the second sub display area ~S110 the image processing module drives the first main display area to display the first part of the first image frame, drives the first sub display area and the fourth sub display area to respectively display the second part of the first image frame adjacent to the first part, drives the second main display area to display the first part of the second image frame, and drives the second sub display area and the third sub display area to respectively display the second part of the second image frame adjacent to the first part ~S120

FIG. 10

MULTI-SCREEN DISPLAY APPARATUS AND DISPLAY METHOD THEREOF

CROSS-REFERENCE TO RELATED APPLICATION

THIS APPLICATION CLAIMS THE PRIORITY BENEFIT OF CHINA APPLICATION (CN201810153832.5 FILED ON 2018 Feb. 22). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display apparatus and a display method, and more particularly to a multi-screen display apparatus and a display method thereof.

BACKGROUND OF THE INVENTION

It is known that display apparatus with multi screens can provide much higher convenience. Through a display apparatus with multi screens, more information can be obtained at the same time from the multi screens and thereby achieving multiplex effect of quick analysis and integration. Therefore, display apparatus with multi screens has been widely used in some particular industries, such as equity securities industry. In general work, the use of the multi screens also improves the work efficiency. In addition, when the multi screens have outputs simultaneously, user can adjust the size of the display image by himself/herself and enjoy the different visual perception. Moreover, most of the current high-end graphics card support the multi-screen output; therefore, user can assemble the multi screens according to his/her desire after purchasing the multi screens and enjoy the display images with higher quality. In addition, multi-screen is also popular in the entertainment market, especially to the video game players.

In the display industry, curved screen is one of the key development projects. Because having the curved surface design, curved screen makes viewer have immersive visual experience, feel like being in a surround vision with zero degrees and feel a more-vivid visual effect when the image has a larger depth or viewing distance gets closer.

However, both of the flat screen and the curved screen include a frame surrounding the display area. Therefore, when multi screens are assembled to one unit, the frames in the jointing position may affect the viewing quality.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a multi-screen display apparatus to improve the display quality affected by the frame of the screen.

The invention further provides a display method for a multi-screen display apparatus to improve the display quality affected by the frame of the screen.

Other objectives and advantages of the invention can be further understood from the technical features disclosed by the invention.

In order to achieve one or some or all of the above objectives or other objectives, an embodiment of the invention provides a multi-screen display apparatus, which includes a first display screen, a second display screen and a first prismatic structure optical elements. The first display screen and the second display screen are arranged adjacent to each other. A first included angle is formed between the first display screen and the second display screen, and the first included angle is greater than 90 degrees and less than 180 degrees. The first display screen and the second display screen each have a display area and a frame surrounding the display area. The first prismatic structure optical element is disposed between the first display screen and the second display screen and covers two side edges adjacent to each other in the frames of the first display screen and the second display screen and a part of the display areas. The first prismatic structure optical element includes a substrate and a plurality of prism pillars adjacent one another disposed on the substrate. An extending direction of each of the prism pillars is substantially parallel to the two side edges adjacent to each other. The display area of the first display screen includes a first main display area, a first sub display area and a second sub display area that are sequentially arranged. The display area of the second display screen includes a second main display area, a third sub display area and a fourth sub display area that are sequentially arranged. The fourth sub display area is adjacent to the second sub display area. The first sub display area, the second sub display area, the third sub display area and the fourth sub display area are covered by the first prismatic structure optical element. The first main display area is adapted to display a first part of a first image frame. The first sub display area and the fourth sub display area are adapted to respectively display a second part of the first image frame adjacent to the first part. The second main display area is adapted to display a first part of a second image frame. The second sub display area and the third sub display area are adapted to respectively display a second part of the second image frame adjacent to the first part.

In order to achieve one or some or all of the above objectives or other objectives, an embodiment of the invention provides a display method for a multi-screen display apparatus. The multi-screen display apparatus includes a first display screen and a second display screen. The display method includes steps of: configuring an image processing module to divide a display area of the first display screen into a first main display area, a first sub display area and a second sub display area that are sequentially arranged and divide a display area of the second display screen into a second main display area, a third sub display area and a fourth sub display area that are sequentially arranged, wherein the fourth sub display area is adjacent to the second sub display area; and configuring the image processing module to drive the first main display area to display a first part of a first image frame, drive the first sub display area and the fourth sub display area to respectively display a second part of the first image frame adjacent to the first part, drive the second main display area to display a first part of a second image frame, and drive the second sub display area and the third sub display area to respectively display a second part of the second image frame adjacent to the first part.

In summary, in the multi-screen display apparatus and the display method of the invention, the adjacent two display screens each have a sub display area displaying the same image by dividing the display area of each display screen. As such, the range of the preferred viewing area can be expanded so that the user in the preferred viewing area does not see the two side edges adjacent to each other in the frames of the display screens, and only one of the two sub display areas displaying the same image is seen by the user, and therefore the user can see the completely-spliced image frames.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a flow chart of a display method according to an embodiment of the invention;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
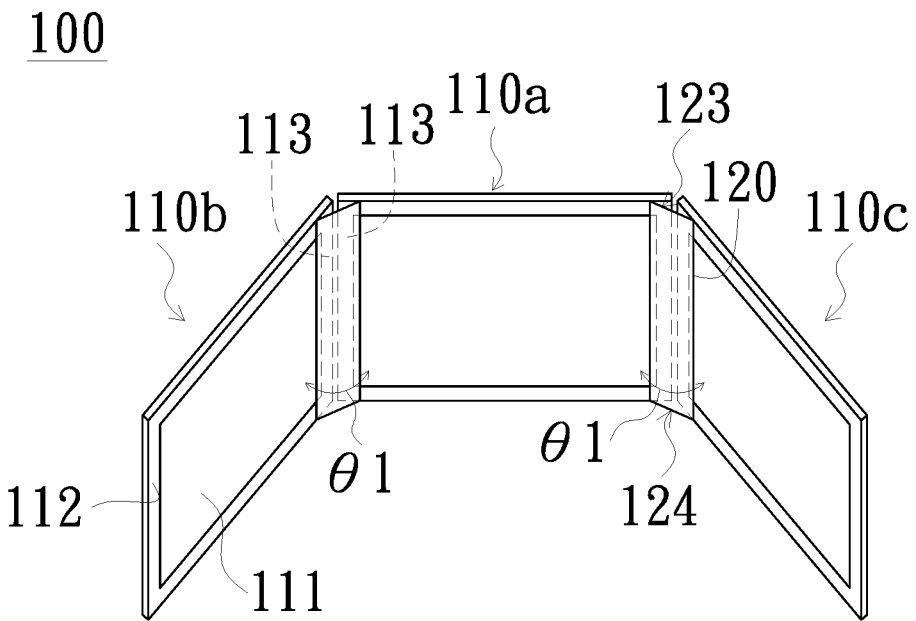
FIG. 1 is a schematic view of a multi-screen display apparatus according to an embodiment of the invention.

FIG. 1 is a schematic view of a multi-screen display apparatus according to an embodiment of the invention. Referring to FIG. 1, the multi-screen display apparatus 100 of the embodiment includes a prismatic structure optical element 120 and a plurality of display screens, and FIG. 1 is exemplified by including three display screens 110a, 110b and 110c. The display screens 110a, 110b and 110c are arranged adjacent one another, and an included angle θ1 is formed between at least one adjacent two display screens of the display screens 110a, 110b, and 110c, wherein the included angle θ1 is greater than 90 degrees and less than 180 degrees. In the embodiment, an included angle θ1 is formed between the adjacent two display screens 110a and 110b, and an included angle θ1 is also formed between the adjacent two display screens 110a and 110c. The angle of the included angle θ1 may depend on different design requirements. In an embodiment, the included angle θ1 is, for example, 130 degrees. In addition, each of the display screens 110a, 110b and 110c has a display area 111 and a frame 112 surrounding the display area 111. The display screens 110a, 110b and 110c in the embodiment may be various types of display screens, such as a liquid crystal display screen, an organic LED display screen, etc., but are not limited thereto. The display screens 110a, 110b and 110c may be flat display screens or curved display screens.

The prismatic structure optical element 120 is disposed between the adjacent two display screens having the included angle θ1, for example, between the display screens 110a and 110b and between the display screens 110a and 110c. That is, the number of prismatic structure optical elements 120 may be one or more, and one prismatic structure optical element 120 may be disposed between any adjacent two display screens having the included angle θ1. In other embodiments, according to design requirements, it is determined whether one prismatic structure optical element 120 is disposed between the adjacent two display screens having the included angle θ1 of the display screens. For example, the display screens 110a and 110b are disposed with the prismatic structure optical element 120 but the display screens 110b and 110c are not disposed with the prismatic structure optical element 120. In addition, each prismatic structure optical element 120 covers the two side edges 113 adjacent to each other of the frames 112 of the corresponding two display screens and a portion of the two display areas 111. For example, the prismatic structure optical element 120 corresponding to the display screens 110a and 110b is disposed in a manner of being inclined relative to the two side edges 113 adjacent to each other of the two display screens 110a and 110b and a portion of the two display areas 111 of the display screens 110a and 110b, so that the prismatic structure optical element 120 can cover the two side edges 113 adjacent to each other of the two display screens 110a and 110b and a portion of the two display areas 111 of the display screens 110a and 110b at the same time; and the prismatic structure optical element 120 corresponding to the display screens 110a and 110c is disposed in a manner of being inclined relative to the two side edges 113 adjacent to each other of the two display screens 110a and 110c and a portion of the two display areas 111 of the display screens 110a and 110c, so that the prismatic structure optical element 120 can cover the two side edges 113 adjacent to each other of the two display screens 110a and 110c and a portion of the two display areas 111 of the display screens 110a and 110c at the same time. In other words, the prismatic structure optical elements 120 corresponding to the display screens 110a and 110b are not parallel or perpendicular to the display screens 110a and 110b, while the prismatic structure optical elements 120 corresponding to the display screens 110a and 110c are not parallel or perpendicular to the display screens 110a and 110c.

Figure 2:
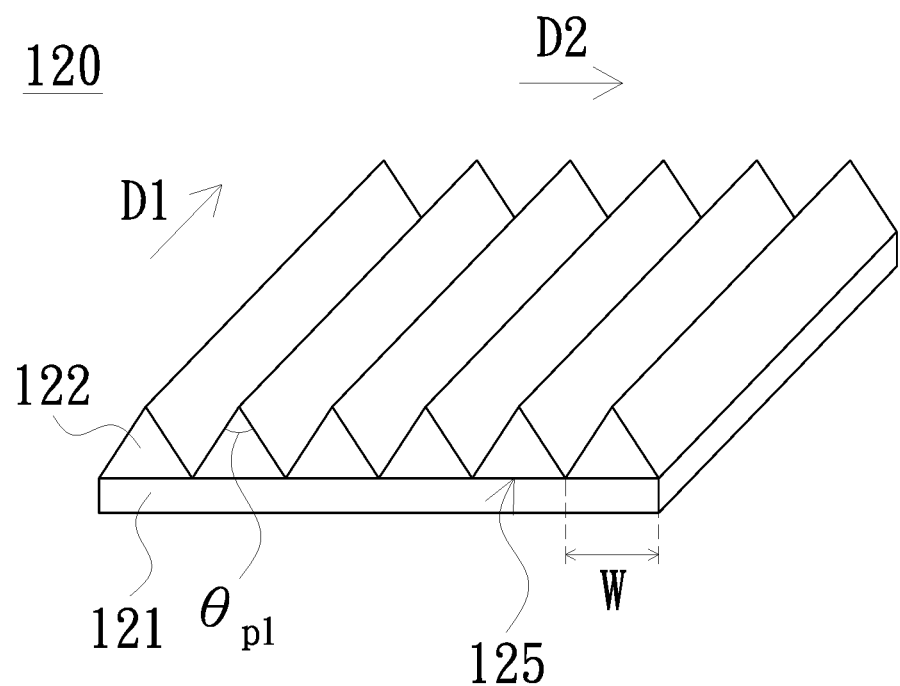
FIG. 2 is a schematic perspective view of the prismatic structure optical element in FIG. 1.

FIG. 2 is a schematic perspective view of the prismatic structure optical element in FIG. 1. Referring to FIGS. 1 and 2, the prismatic structure optical element 120 includes a substrate 121 and a plurality of prism pillars 122 adjacent one another disposed on the substrate 121. The extending direction D1 of each prism pillar 122 is substantially parallel to the two side edges 113 adjacent to each other of the two frames 112 covered by the prismatic optical element 120 in FIG. 1. That is, each prism pillar 122 extends from the upper end 123 to the lower end 124 of the prismatic structure optical element 120 in FIG. 1. The extending direction D1 of each prism pillar 122 is parallel to the longitudinal side edge of the display area 111. In addition, the substrate 121 has, for example, a bearing surface 125 away from the adjacent two display screens (e.g., away from the display screens 110a and 110b or away from the display screens 110a and 110c), that is, the bearing surface 125 faces the viewer. The prism pillar 122 is disposed on the bearing surface 125. The substrate 121 of the embodiment is, for example, a thin film, but the invention does not limit the specific shape of the substrate 121. In addition, each prism pillar 122 in the embodiment is, for example, an isosceles triangular prism pillar, and the vertex angle θp1 of the isosceles triangular prism pillar is away from the substrate 121, that is, the vertex angle θp1 is opposite to the substrate 121 and is not connected to the bearing surface 125 of the substrate 121. The angle of the vertex angle θp1 may depend on different design requirements. The width W of the prism pillar 122 is approximately tens of micrometers (μm), for example, between 25 μm and 100 μm, such as 50 μm.

Figure 3:
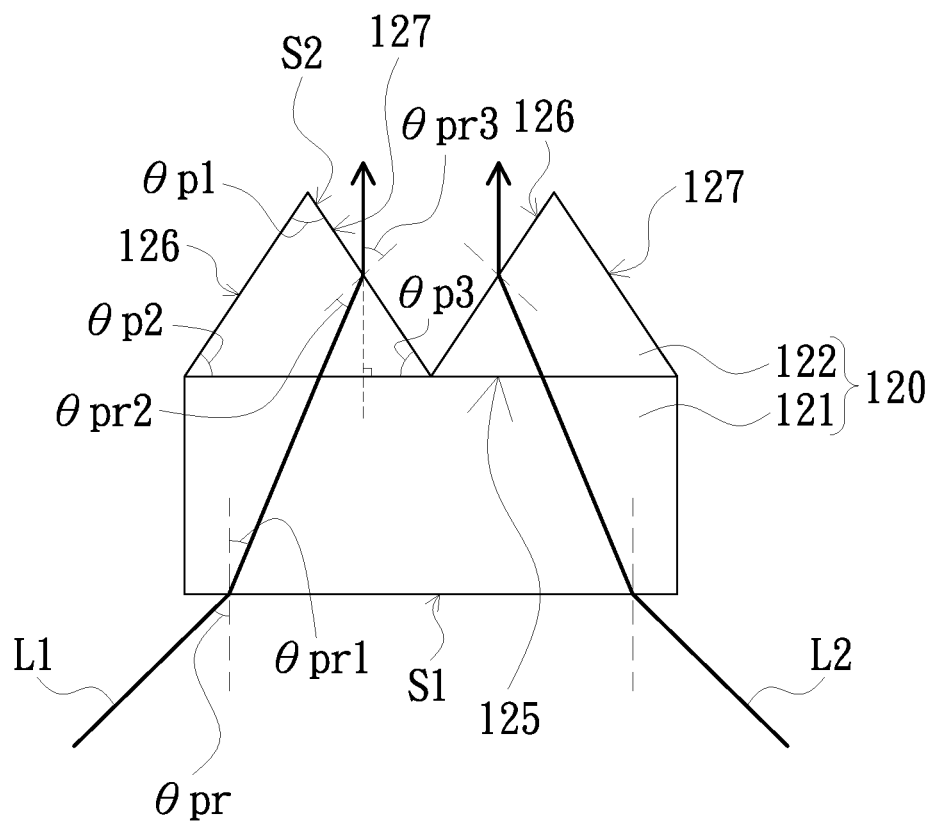
FIG. 3 is a schematic view of a prismatic structure optical element and its refracted light according to an embodiment of the invention.

In the following, an embodiment will be described in detail how to design the specific size and disposing angle of the prismatic structure optical element 120 according to different design requirements, but the invention is not limited thereto. FIG. 3 is a schematic view of a prismatic structure optical element and its refracted light according to an embodiment of the invention. Referring to FIG. 3, θpr is the incident angle of the light L1 at the interface S1, θp1 is the vertex angle of the prism pillar 122 (isosceles triangle prism pillar), θp2 and θp3 are the base angles of the prism pillar 122 (isosceles triangular prism pillar), θpr1 is the refraction angle of the light L1 passing through the interface S1, θpr2 is the incident angle of the light L1 at the interface S2, θpr3 is the refraction angle of the light L1 passing through the interface S2, Np is the refractive index of the prismatic structure optical element 120, and Na is the refractive index of air. It is assumed that θpr is the angle of the light L1 in which the light L1 can exit in a forward direction (the light L1 is perpendicular to the bearing surface 125 when exiting) after being refracted by the prismatic structure optical element 120.

Since the prism pillar 122 is an isosceles triangular prism pillar, θp2=θp3, θp1=180−θp2−θp3, and therefore θp3=(180−θp1)/2.

In addition, θpr3=θp3, and according to Snell's Law, Np×sin(θpr2)=Na×sin(θpr3), and therefore θpr2=asin(Na×sin(θpr3)/Np).

In addition, θpr1=θp3−θpr2, and according to the Snell's law, Np×sin(θpr1)=Na×sin (θpr), and therefore θpr=asin (Np×sin(θpr1)/Na).

Combining the above equations, it is obtained that θpr=asin(Np×sin((180−θp1)/2−(asin(Na×sin((180−θp1)/2)/Np)))/Na). It is obtained that θpr is 26.8 degrees when θp1=90 degrees, Na=1, Np=1.52.

Figure 4A:
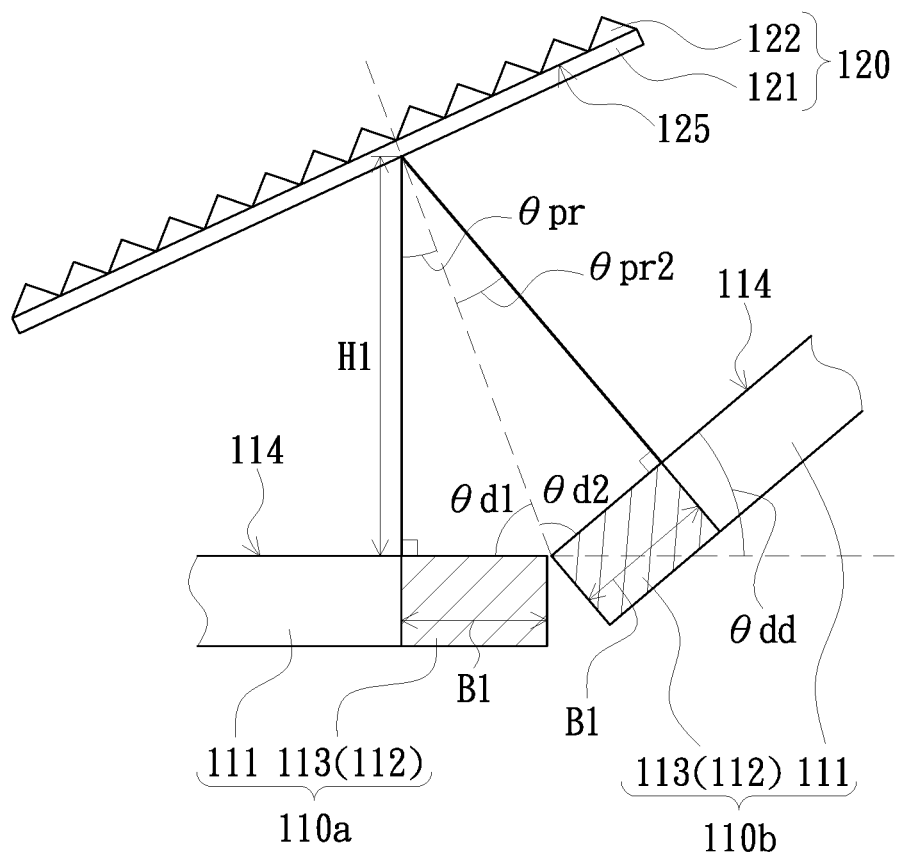
FIGS. 4A and 4B are schematic views of sizes and disposing angles of designing prismatic structure optical element according to an embodiment of the invention.
Figure 4B:
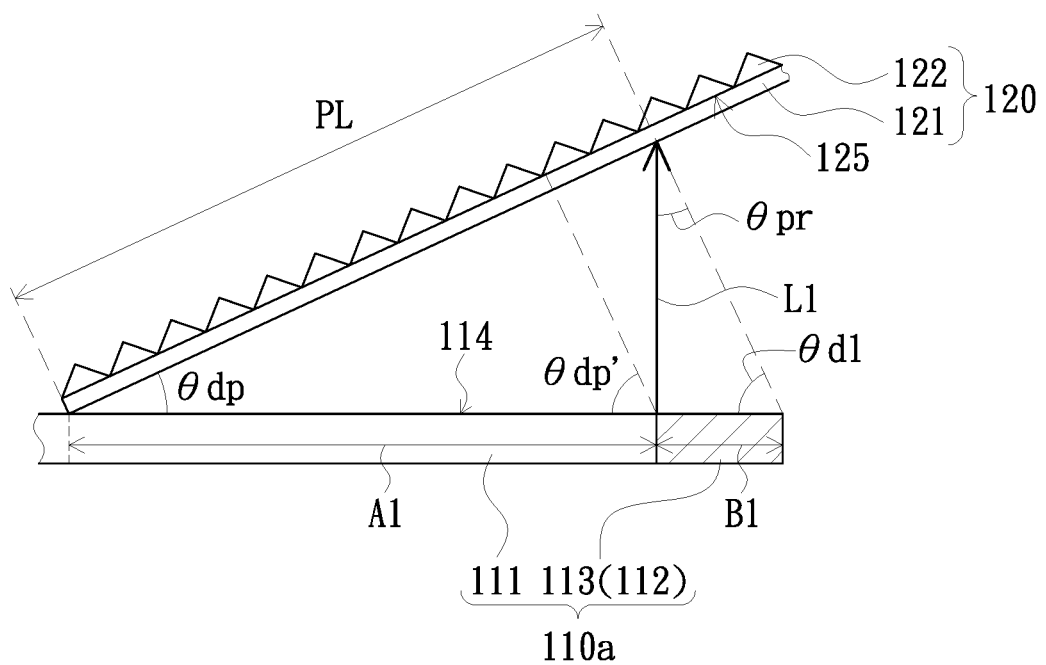

According to the above derivation, the forward light (the light emitted perpendicular to the display area 111) of the portion covered by the prismatic structure optical element 120 in the display area 111 of FIG. 1 can also exit in a forward direction (the light is emitted perpendicular to the bearing surface 125) after being infracted by the prismatic structure optical element 120 if it enters the prismatic structure optical element 120 at the angle θpr. Based on such conditions, the size and disposing angle of the prismatic structure optical element 120 can be further derived. FIGS. 4A and 4B are schematic views illustrating a designing of sizes and disposing angles of prismatic structure optical elements according to an embodiment of the invention. In FIGS. 4A and 4B, θd1 is the included angle between the display screen 110a and the normal direction of the bearing surface 125 of the substrate 121 of the prismatic structure optical element 120, θd2 is the included angle between the display screen 110b and the normal direction of the bearing surface 125 of the substrate 121 of the prismatic structure optical element 120, θdp is the included angle between the display screen 110a and the prismatic structure optical element 120, B1 is the width of the side edge 113 of the frame 112 of the display screens 110a and 110b, A1 is the width of the display area 111 of the display screen 110a covered by the prismatic structure optical element 120, PL is half the width of the prism structure of the optical element 120, θdd is the included angle between the light exiting surface 114 of the display area 111 of the display screen 110b and the light exiting surface 114 of the display area 111 of the display screen 110a, θdp' is the included angle between the normal direction of the bearing surface 125 of the substrate 121 of the prismatic structure optical element 120 and the light emitting surface 114 of the display area 111 of the display screen 110a, and H1 is the distance from the boundary between the display area 111 and the side edge 113 of the display screen 110a to the prismatic structure optical element 120 along the normal direction of the display area 111. From FIGS. 4A and 4B, it is obtained that θd1=90−θpr, H1=B1/tan(θpr), θdd=180−θd1−θd2, θdp'=90−θpr, θdp=90−θdp', A1=H1/Tan(θdp), and PL=A1/cos(θdp). And therefore it can be deduced that θdd=2×θpr, A1=B1/tan(θpr) 2, and PL=B1 tan(θpr)2/cos(θpr). In an embodiment, if B1 is 4 millimeters (mm) and θpr is 26.8 degrees, it can be deduced that θdd is 53.6 degrees, A1 is 15.68 mm, and PL is 17.57 mm.

According to the above embodiments, the invention can design various prismatic structure optical elements that meet different design requirements in accordance with the specifications of the display screens, the materials of the prismatic structure optical elements, and the parameters such as shapes and angles of the prism pillars. As shown in FIG. 3, if the light L1 is the light exiting in a forward direction from the display area 111 of the display screen 110a in FIG. 4A and the light L2 is the light exiting in a forward direction from the display area 111 of the display screen 110b in FIG. 4A, the light L2 may be further designed to emit in a forward direction (light emitted perpendicular to the bearing surface 125) after passing through the prismatic structure optical element 120 according to the above embodiments.

Figure 5:
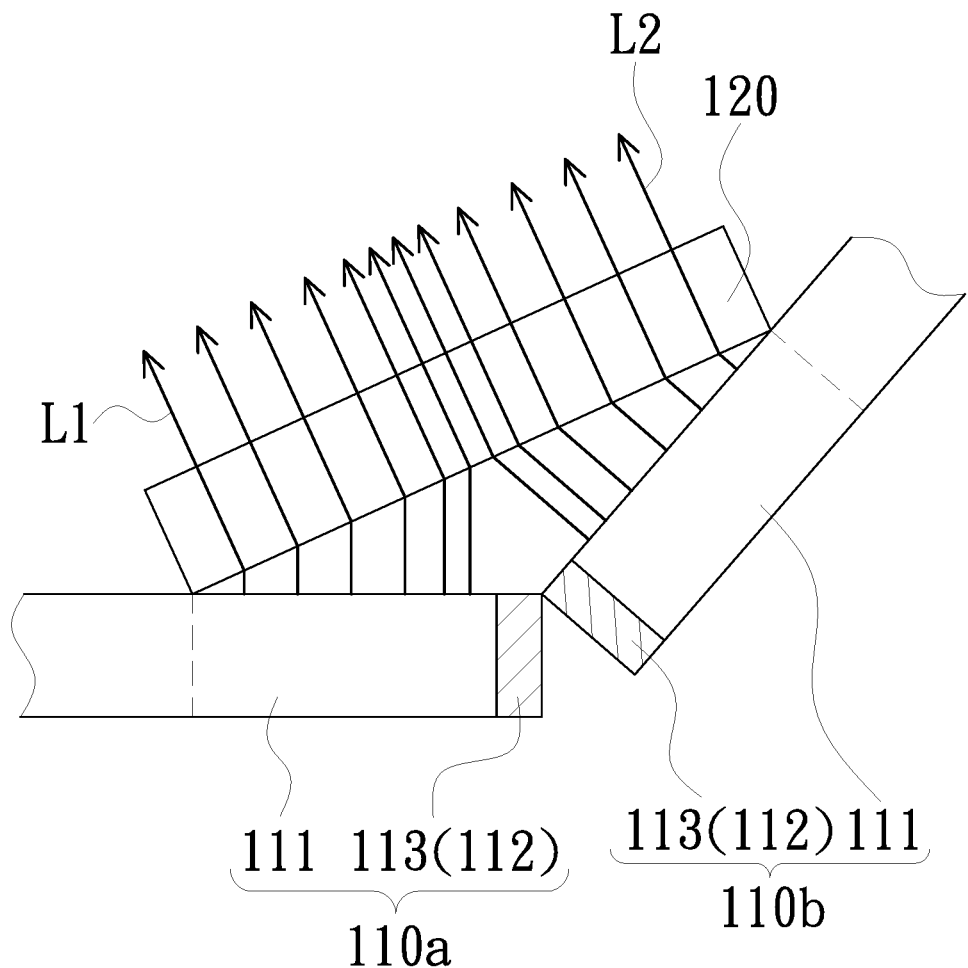
FIG. 5 is a schematic view of the optical path of the forward light of the adjacent two display screens passing through the prismatic structure optical element according to an embodiment of the invention.

FIG. 5 is a schematic view of the optical path of the forward light of the adjacent two display screens passing through the prismatic structure optical elements according to an embodiment of the invention. Referring to FIG. 5, the prismatic structure optical element 120 refracts the lights L1 and L2 emitting in a forward direction from the display areas 111 of the display screens 110a and 110b, and the lights L1 and L2 can also emit in a forward direction after passing through the prismatic structure optical element 120. Through the refraction of the prismatic structure optical element 120, the areas corresponding to the adjacent two side edges 113 of the frames 112 of the adjacent two display screens 110a and 110b also have the lights L1 and L2 transmitted to the viewer, so the viewer will not view the adjacent two side edges 113 of the frames 112 of the adjacent two display screens 110a and 110b. As such, when the adjacent two display screens 110a and 110b jointly display one image frame, the viewer can view a well-spliced image frame without affected display quality due to the frames 112. Similarly, since the prismatic structure optical element 120 is disposed between the adjacent two display screens 110a and 110c in FIG. 1, the display quality is not affected by the frames 112.

Referring to FIGS. 3 and 5, each of the prism pillars 122 has two light exiting surfaces 126 and 127. The light L1 partially and emitted in a forward direction from the display area 111 of the display screen 110a covered by the prismatic structure optical element 120 exits through the light emitting surface 127 of the prism pillar 122, so the light emitting surface 126 of the prism pillar 122 corresponding to the display area 111 of the display screen 110a is not easy to emit light with strong energy, and therefore there is a problem of low luminance. In addition, since the direction of the light exited from the light emitting surface 126 is different from the direction of the light L1 emitted from the light exiting surface 127, the viewer may perceive a slight ghost phenomenon. The light L2 partially and emitted in a forward direction from the display area 111 of the display screen 110b covered by the prismatic structure optical element 120 exits through the light emitting surface 126 of the prism pillar 122, so the light emitting surface 127 of the prism pillar 122 corresponding to the display area 111 of the display screen 110b is not easy to emit light with strong energy, and therefore there is a problem of low luminance. In addition, since the direction of the light exited from the light emitting surface 127 is different from the direction of the light L2 emitted from the light exiting surface 126, the viewer may perceive a slight ghost phenomenon.

Figure 6:
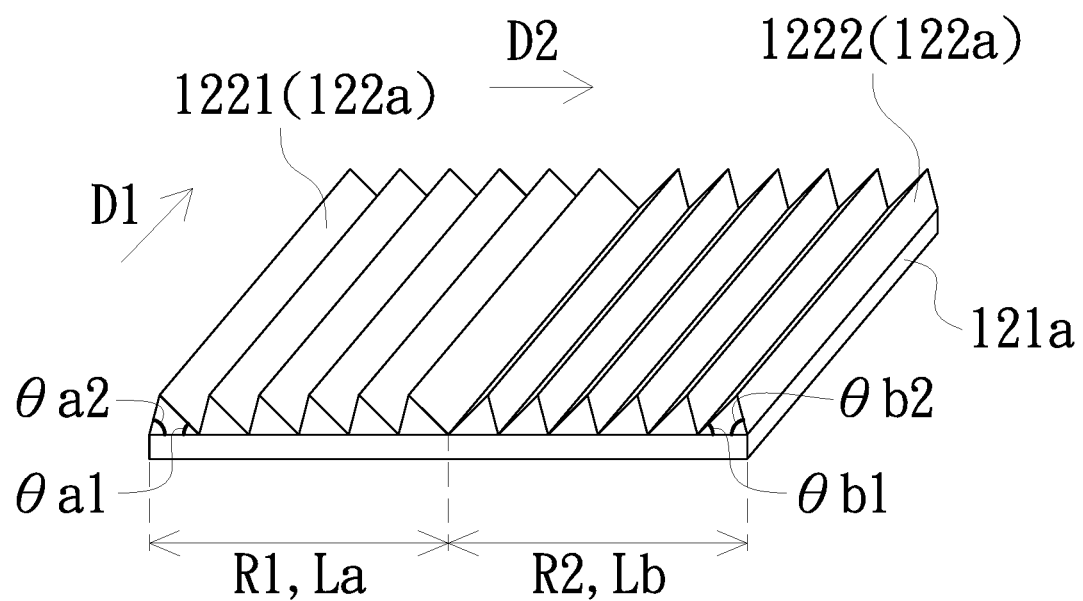
FIG. 6 is a schematic view of a prismatic structure optical element of a multi-screen display apparatus according to another embodiment of the invention.
Figure 7:
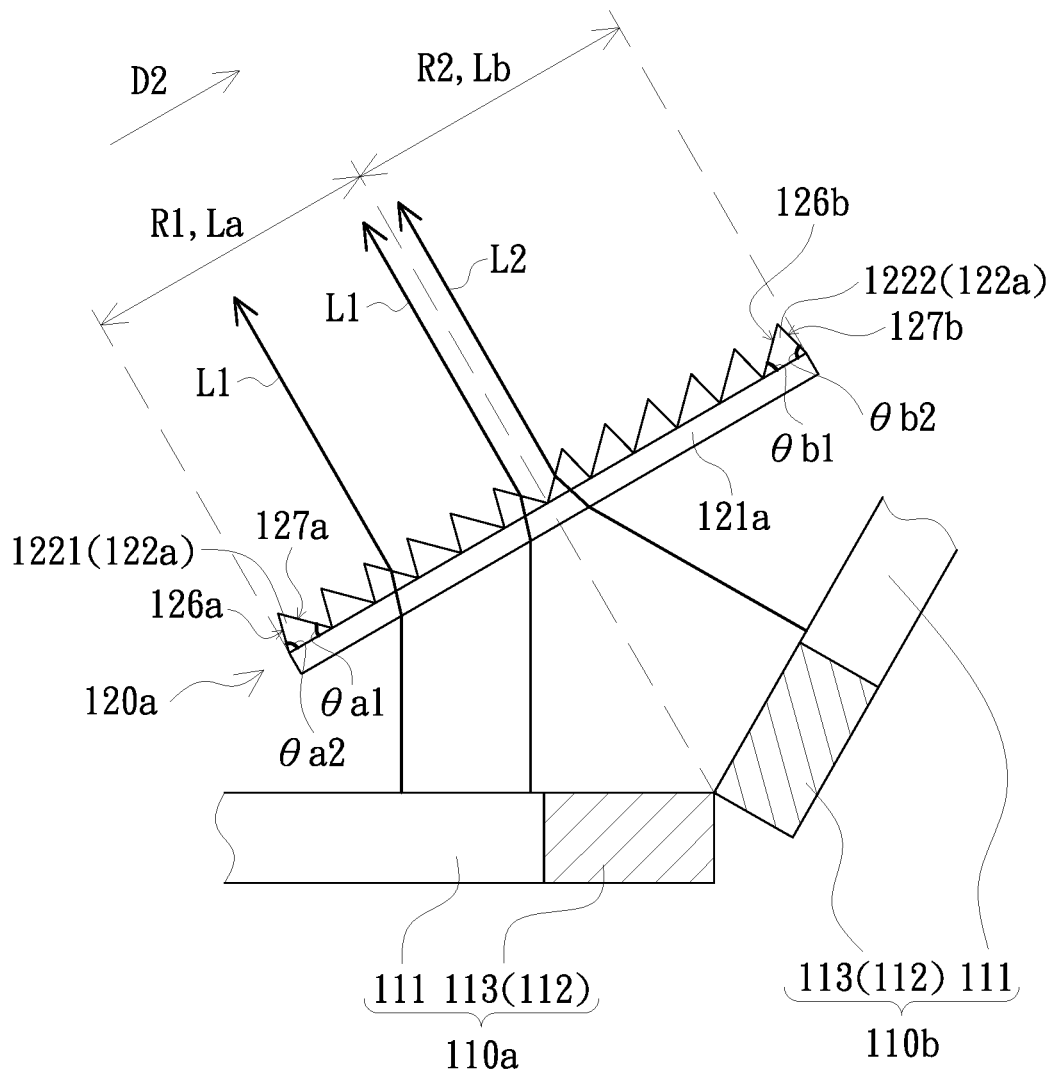
FIG. 7 is a schematic view of the prismatic structure optical element in FIG. 6 and its refracted light.

In order to improve the above problems, another embodiment of the invention provides a prismatic structure optical element. FIG. 6 is a schematic view of a prismatic structure optical element of a multi-screen display apparatus according to another embodiment of the invention, and FIG. 7 is a schematic view of the prismatic structure optical element in FIG. 6 and its refracted light. Referring first to FIG. 6, the prismatic structure optical element 120a of the embodiment is similar to the prismatic structure optical element 120 described above, and only the main difference will be described below. The prismatic structure optical element 120a includes a substrate 121a and a plurality of prism pillars 122a. The prism pillars 122a are arranged on the substrate 121a in a predetermined direction D2, and an extending direction D1 of each prism pillar 122a is substantially parallel to the adjacent two sides edges 113 as described in FIG. 1. The substrate 121a includes adjacent first area R1 and second area R2, which correspond to portions of the two display screens 110a and 110b or display screens 110a and 110c described in FIG. 1, respectively. The length of the first area R1 in the predetermined direction D2 is La, the length of the second area R2 in the predetermined direction D2 is Lb, and La may be greater than or equal to Lb, but not limited thereto. FIG. 6 is exemplified by that La=Lb. In addition, the prism pillars 122a include a plurality of first prism pillars 1221 arranged in the first area R1 and a plurality of second prism pillars 1222 arranged in the second area R2. Each of the first prism pillars 1221 has two interior angles θa1 and θa2 adjacent to the substrate 121a. The interior angle θa1 is located between the interior angle θa2 and the second area R2, and θa1<θa2. Each of the second prism pillars 1222 has two interior angles θb1 and θb2 adjacent to the substrate 121a. The interior angle θb1 is located between the interior angle θb2 and the first area R1, and θb1<θb2.

In the embodiment, the first area R1 of each prismatic structure optical element 120a is, for example, corresponding to the display screen 110a located in the middle of the display screens 110a, 110b and 110c in FIG. 1. In addition, the prism pillar 122a is, for example, a triangular prism pillar. The interior angles θa1, θa2, θb1 and θb2 satisfy the following equations: 40°≤θa1<60°, 60°≤θa2≤90°, 40°≤θb1<60°, and 60≤θb2≤90°. In an embodiment, the interior angle θa1=θb1=45°, and θa2 and θb2 are, for example, equal to 71°, respectively.

In the first prism pillar 1221, with the design of the interior angle θa2 being greater than the interior angle θa1, the orthogonal projection area of the light exiting surface 127a adjacent to the interior angle θa1 on the substrate 121a is greater than the orthogonal projection area of the light exiting surface 126a adjacent to the interior angle θa2 on the substrate 121a. Therefore, most of the light L1 emitted in a forward direction from the display area 111 of the display screen 110a can be emitted from the light exiting surface 127a. As such, not only the luminance is increased but also the ghost phenomenon caused by the light emitted from the light emitting surface 126a is improved. Similarly, In the second prism pillar 1222, with the design of the interior angle θb2 being greater than the interior angle θb1, the orthogonal projection area of the light exiting surface 126b adjacent to the interior angle θb1 on the substrate 121a is greater than the orthogonal projection area of the light exiting surface 127b adjacent to the interior angle θb2 on the substrate 121a. Therefore, most of the light L2 emitted in a forward direction from the display area 111 of the display screen 110b can be emitted from the light exiting surface 126b. As such, not only the luminance is increased but also the ghost phenomenon caused by the light emitted from the light emitting surface 127b is improved.

In an embodiment, the interior angle θa1=θb1=45° and the θa2 and the θb2 may all be equal to 90°, as such, the orthographic projection of the light emitting surface 127a adjacent to the interior angle θa1 on the substrate 121a may substantially cover the entire first area R1, and the orthogonal projection of the light emitting surface 126b adjacent to the interior angle θb1 on the substrate 121a may substantially cover the entire second area R2. Therefore, almost all of the light L1 emitted in a forward direction from the display area 111 of the display screen 110a can be emitted from the light exiting surface 127a, so that the luminance can be further increased and the ghost phenomenon caused by the light emitted from the light exiting surface 126a can be further improved. Similarly, almost all of the light L2 emitted in a forward direction from the display area 111 of the display screen 110b can be emitted from the light exiting surface 126b, so that the luminance can be further increased and the ghost phenomenon caused by the light emitted from the light exiting surface 127b can be further improved.

Although the embodiment of FIG. 6 is exemplified by that the angles of the inner angles θa2 and θb2 are equal to each other, the angles of the inner angles θa2 and θb2 may be different from each in other embodiments. For example, the interior angles θa1, θa2, θb1 and θb2 satisfy the following equations: $40°≤θa1<60°$, $60°≤θa2≤75°$, $40°≤θb1<60°$, $75°≤θb2≤90°$, and $θa2<θb2$. In an embodiment, the interior angle θa1=θb1=45°, θa2 is equal to 71° for example, and the interior angle θb2 is equal to 90° for example. In another embodiment, the interior angle θa1=θb1=51.5°, θa2 is equal to 69° for example, and the interior angle θb2 is equal to 90° for example.

Figure 8:
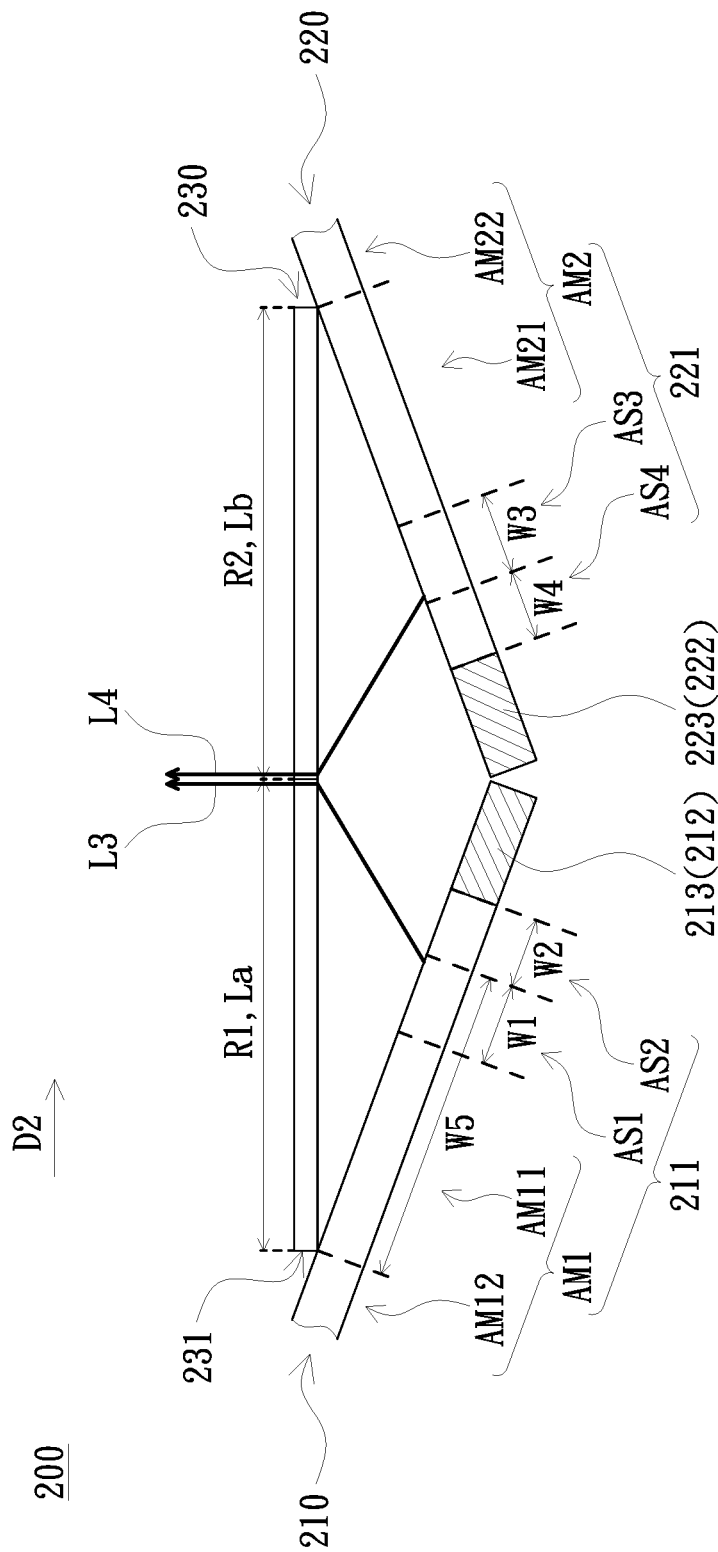
FIG. 8 is a schematic view of a multi-screen display apparatus according to an embodiment of the invention.
Figure 9:
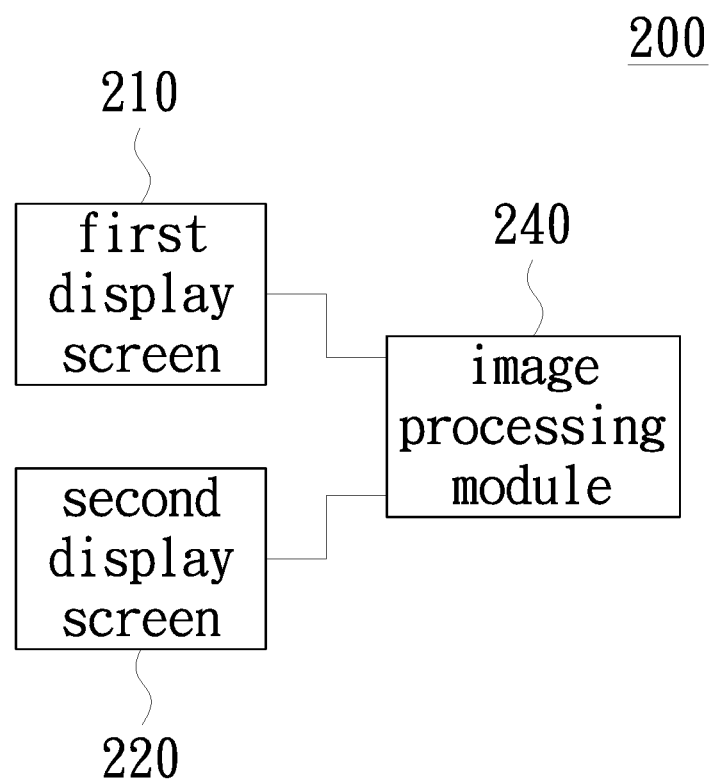
FIG. 9 is a block diagram of a multi-screen display apparatus according to an embodiment of the invention.

FIG. 8 is a schematic view of a multi-screen display apparatus according to an embodiment of the invention, and FIG. 9 is a block diagram of a multi-screen display apparatus according to an embodiment of the invention. Referring to FIG. 8, the multi-screen display apparatus 200 of the embodiment includes a first display screen 210, a second display screen 220, and a first prismatic structure optical element 230. The first display screen 210 and the second display screen 220 are arranged adjacent to each other in a manner similar to the display screens 110a and 110b in FIG. 1. For example, the first angle between the first display screen 210 and the second display screen 220 is like the angle θ1 in FIG. 1. The first display screen 210 has a display area 211 and a frame 212 surrounding the display area 211, and the second display screen 220 has a display area 221 and a frame 222 surrounding the display area 221. In addition, the position where the first prismatic structure optical element 230 is disposed is also similar to the prismatic structure optical element 120 in FIG. 1 and no redundant detail is to be given herein. The first prismatic structure optical element 230 of the embodiment may select the prismatic structure optical element 120a shown in FIG. 6 or the prismatic structure optical element of the above other embodiments. In addition, as shown in FIG. 9, the multi-screen display apparatus 200 of the embodiment may further include an image processing module 240 electrically connected to the first display screen 210 and the second display screen 220. In another embodiment, the image processing module 240 may be externally connected to the multi-screen display apparatus 200 and is a component not belonging to the multi-screen display apparatus 200. The image processing module 240 may specifically be a display card, which includes an image processor, a circuit board and other components.

Figure 11:
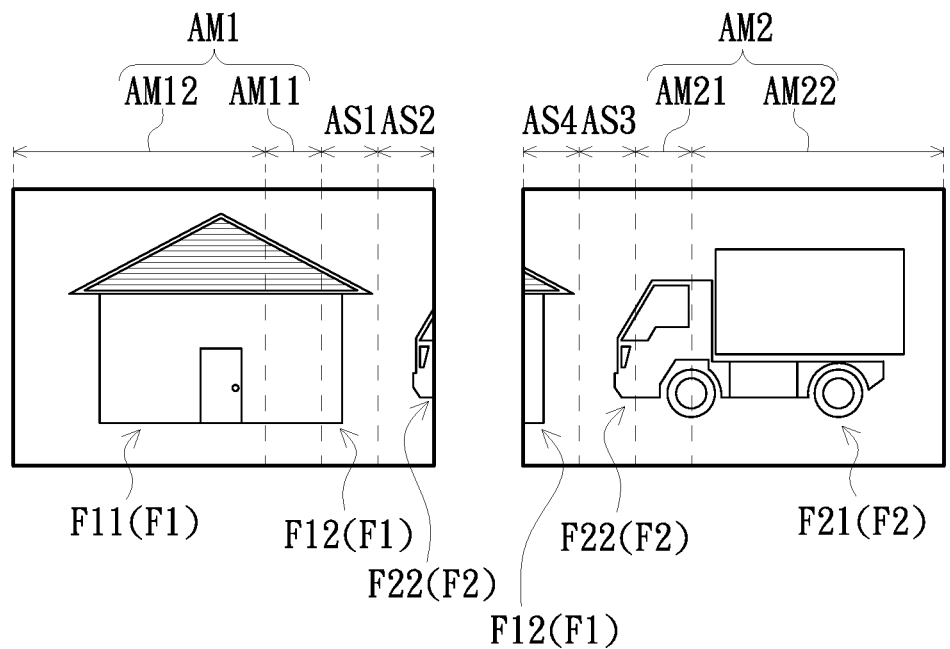
FIG. 11 is a schematic view of the first display screen and the second display screen in FIG. 8 displaying image frames.

FIG. 10 is a flow chart of a display method according to an embodiment of the invention. FIG. 11 is a schematic view of the first display screen and the second display screen in FIG. 8 displaying image frames. Refer to FIGS. 8 to 10 first, the display method of the embodiment is applicable to the above-mentioned multi-screen display apparatus 200 and the display method includes the following steps. As shown in step S110, the image processing module 240 divides the display area 211 of the first display screen 210 into the first main display area AM1, the first sub display area AS1 and the second sub display area AS2 arranged in sequence and divides the display area 221 of the second display screen 220 into the second main display area AM2, the third sub display area AS3 and the fourth sub display area AS4 arranged in sequence, wherein the fourth sub display area AS4 is adjacent to the second sub display area AS2. The first main display area AM1 includes, for example, a first block AM11 and a second block AM12. The first block AM11 is covered by the first prismatic structure optical element 230, and the second block AM12 is not covered by the first prismatic structure optical element 230. That is, the second block AM12 is outside the coverage of the first prismatic structure optical element 230. The second main display area AM2 includes, for example, a third block AM21 and a fourth block AM22. The third block AM21 is covered by the first prismatic structure optical element 230, and the fourth block AM22 is not covered by the first prismatic structure optical element 230. That is, the fourth block AM22 is outside the coverage of the first prismatic structure optical element 230. In addition, the first sub display area AS1, the second sub display area AS2, the third sub display area AS3 and the fourth sub display area AS4 are covered by the first prismatic structure optical element 230, for example. The widths of the first sub display area AS1, the second sub display area AS2, the third sub display area AS3 and the fourth sub display area AS4 may be predetermined fixed values. In an embodiment, the respective widths W1 and W2 of the first sub display area AS1 and the second sub display area AS2 are, for example, less than or equal to the width of ten pixels of the first display screen 210, and the respective widths W3 and W4 of the third sub display area AS3 and the fourth sub display areas AS4 are less than or equal to the width of ten pixels of the second display screen 220.

Next, refer to FIGS. 9 to 11. In the multi-screen display apparatus 200 and the display method according to the embodiment of the invention, first, the image processing module 240 divides an image F to be presented on the first display screen 210 and the second display screen 220 into a first image frame F1 and a second image frame F2. Then, as shown in step S120, the image processing module 240 drives the first main display area AM1 to display the first part F11 of the first image frame F1, drives the first sub display area AS1 and the fourth sub display area AS4 to respectively display the second part F12 of the first image frame F1 adjacent to the first part F11, drives the second main display area AM2 to display the first part F21 of the second image frame F2, and drives the second sub display area AS2 and the third sub display area AS3 to respectively display the second part F22 of the second image frame F2 adjacent to the first part F21.

Refer to FIGS. 8 and 11. By the above display manner, the lights L3 and L4 are substantially parallel to the viewing direction of the user when the user is located at a predetermined preferred viewing position (as shown in FIG. 8), and the user can receive the lights L3 and L4, wherein the light L3 is from the first sub display area AS1 and is refracted to the user via the part of the first area R1 adjacent to the second area R2 of the first prismatic structure optical element 230, and the light L4 is from the third sub display area AS3 and is refracted to the user via the part of the second area R2 adjacent to the first area R1 of the first prismatic structure optical element 230. Therefore, even if viewing the boundary between the first area R1 and the second area R2, the user will not see the two side edges 213 and 223 adjacent to each other in the frames 212 and 222 of the first display screen 210 and the second display screen 220 as well as the images displayed by the second sub display area AS2 and the fourth sub display area AS4. In other words, the user will see the first part F11 of the first image frame F1 displayed by the first main display area AM1, the second part F12 of the first image frame F1 displayed by the first sub display area AS1 adjacent to the first part F11, the first part F21 of the second image frame F2 displayed by the second main display area AM2, and the second part F22 of the second image frame F2 displayed by the third sub display area AS3 adjacent to the first part F21. Therefore, the user can see the first image frame F1 and the second image frame F2 which are spliced completely.

Figure 12A:
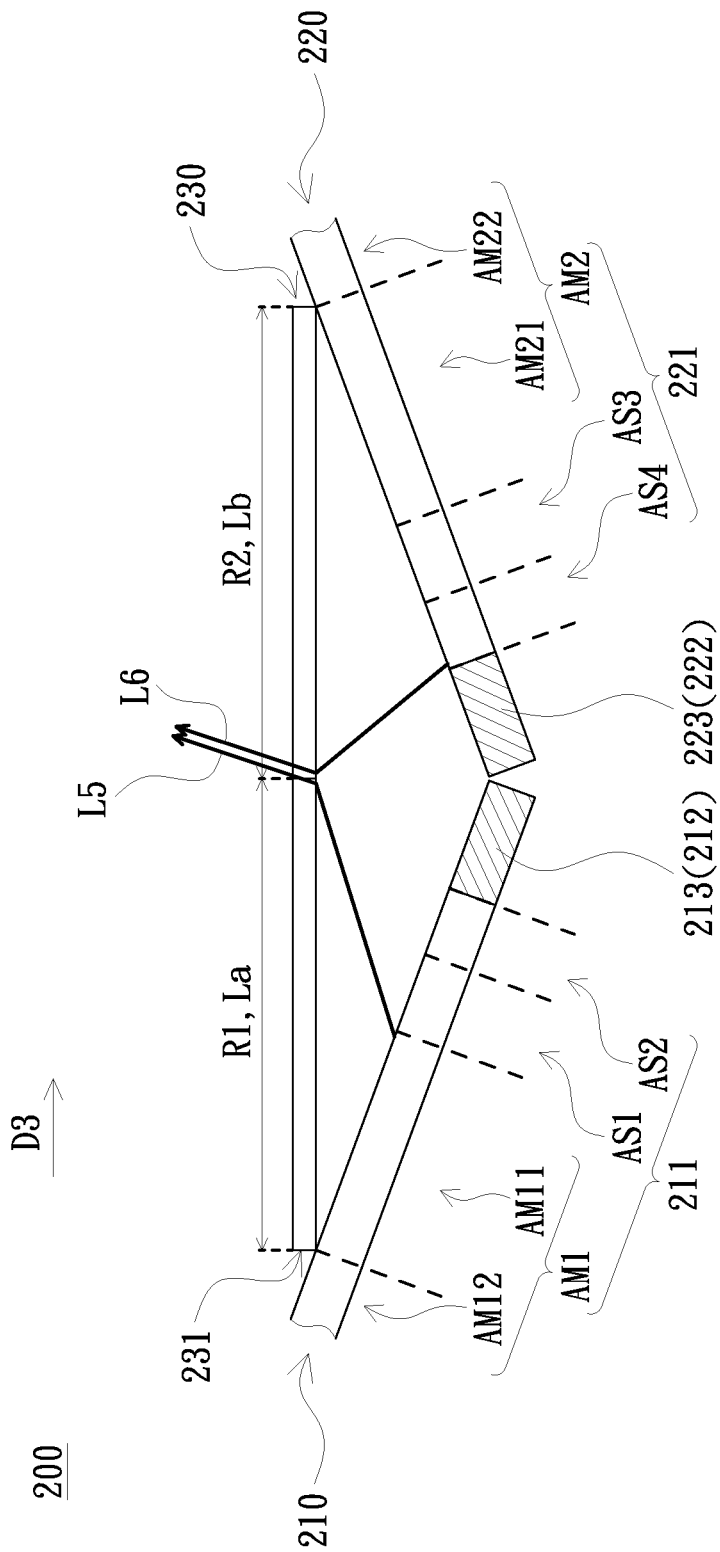
FIGS. 12A and 12B are schematic views illustrating the partial optical path when the user is located at a different viewing position than FIG. 8.
Figure 12B:
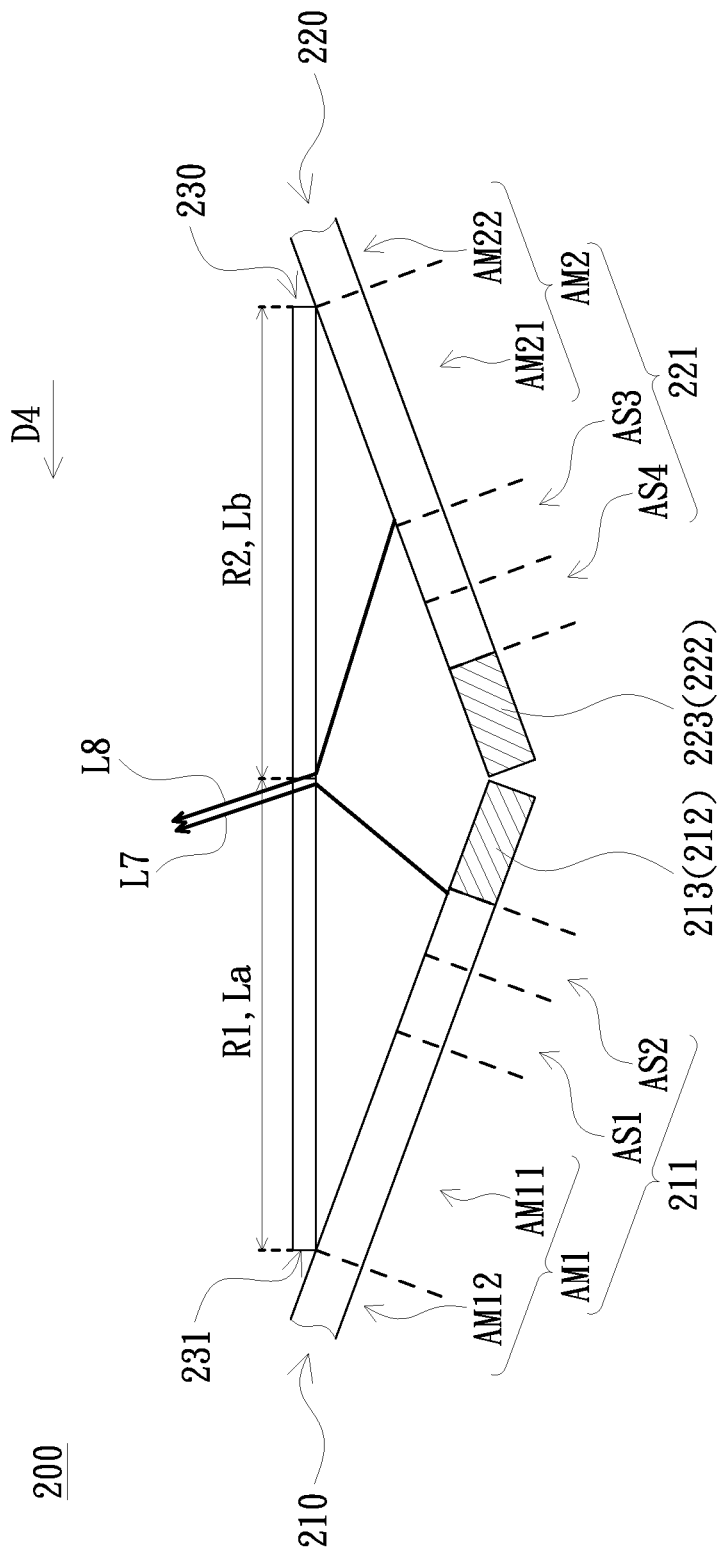

FIGS. 12A and 12B are schematic views illustrating the partial optical path when the user is located at a different viewing position than FIG. 8. Referring to FIG. 12A first. The user can receive the lights L5 and L6 when the user moves, for example, laterally in the moving direction D3 from the viewing position in FIG. 8 to the viewing position in which the lights L5 and L6 in FIG. 12A are substantially parallel to the viewing direction of the user, wherein the light L5 is from the first main display area AM1 and is refracted to the user via the part of the first area R1 adjacent to the second area R2 of the first prismatic structure optical element 230, and the light L6 is from the fourth sub display area AS4 and is refracted to the user via the part of the second area R2 adjacent to the first area R1 of the first prismatic structure optical element 230. Therefore, even if viewing the boundary between the first area R1 and the second area R2, the user will not see the two side edges 213 and 223 adjacent to each other in the frames 212 and 222 of the first display screen 210 and the second display screen 220 as well as the images displayed by the first sub display area AS1 and the second sub display area AS2. In other words, the user will see the first part F11 of the first image frame F1 displayed by the first main display area AM1, the second part F12 of the first image frame F1 displayed by the fourth sub display area AS4 adjacent to the first part F11, the first part F21 of the second image frame F2 displayed by the second main display area AM2, and the second part F22 of the second image frame F2 displayed by the third sub display area AS3 adjacent to the first part F21. Therefore, the user can see the first image frame F1 and the second image frame F2 which are spliced completely.

Referring to FIG. 12B. The user can receive the lights L7 and L8 when the user moves, for example, laterally in the moving direction D4 from the viewing position in FIG. 8 to the viewing position in which the lights L7 and L8 in FIG. 12B are substantially parallel to the viewing direction of the user, wherein the light L7 is from the second sub display area AS2 and is refracted to the user via the part of the first area R1 adjacent to the second area R2 of the first prismatic structure optical element 230, and the light L8 is from the second main display area AM2 and is refracted to the user via the part of the second area R2 adjacent to the first area R1 of the first prismatic structure optical element 230. Therefore, even if viewing the boundary between the first area R1 and the second area R2, the user will not see the two side edges 213 and 223 adjacent to each other in the frames 212 and 222 of the first display screen 210 and the second display screen 220 as well as the images displayed by the third sub display area AS3 and the fourth sub display area AS4. In other words, the user will see the first part F11 of the first image frame F1 displayed by the first main display area AM1, the second part F12 of the first image frame F1 displayed by the first sub display area AS1 adjacent to the first part F11, the first part F21 of the second image frame F2 displayed by the second main display area AM2, and the second part F22 of the second image frame F2 displayed by the second sub display area AS2 adjacent to the first part F21. Therefore, the user can see the first image frame F1 and the second image frame F2 which are spliced completely.

Conventionally, in order to present an image frame to be presented on a multi-screen display apparatus, an image processing module divides an image to be presented into a plurality of sub image frames corresponding to the multi-screen display apparatus and then splices the sub image frames displayed on the screens to a complete image. However, in the multi-screen display apparatus of FIG. 8, if the known technology divides an image to be presented into a first image frame F1 and a second image frame F2 which are corresponding and presented on the display area 211 of the first display screen 210 and the display area 221 of the second display screen 220 respectively, the prismatic structure optical element 230 refracts the light L3 emitted from the display area 211 of the first display screen 210 and the light L4 emitted from the display area 221 of the second display screen 220. Taking FIG. 8 as an example, when the user is located at the predetermined preferred viewing position, the lights L3 and L4 are substantially parallel to the user's viewing direction and the user can receive the lights L3 and L4, wherein the light L3 is from the first sub display area AS1 and is refracted to the user via the part of the first area R1 adjacent to the second area R2 of the first prismatic structure optical element 230, and the light L4 is from the third sub display area AS3 and is refracted to the user via the part of the second area R2 adjacent to the first area R1 of the first prismatic structure optical element 230. Therefore, when the user views toward the boundary between the first area R1 and the second area R2, although the two side edges 213 and 223 adjacent to each other in the frames 212 and 222 of the first display screen 210 and the second display screen 220 are not visible, the images displayed by the second sub display area AS2 and the fourth sub display area AS4 are also not visible. In other words, the user can only see the image frames displayed by the first main display area AM1 and the first sub display area AS1 and the image frames displayed by the second main display area AM2 and the third sub display area AS3. Therefore, the user cannot see the first image frame F1 and the second image frame F2 which are spliced completely, and the viewed image frame misses from the images displayed by the second sub display area AS2 and the fourth sub display area AS4. Similarly, in FIGS. 12A and 12B, by the method of known technology in which an image is divided into a plurality of sub image frames corresponding to the multi-screen display apparatus and each sub image frame is presented by each display screen, the image frame viewed by the user also miss part of the image.

Based on the above, in the multi-screen display apparatus 200 and the display method of the embodiment of the invention, the first main display area AM1 is adapted to display the first part F1t of the first image frame F1, the first sub display area AS1 and the fourth sub display area AS4 are adapted to respectively display the second part F12 of the first image frame F1 adjacent to the first part F11, the second main display area AM2 is adapted to display the first part F21 of the second image frame F2, and the second sub display area AS2 and the third sub display areas AS3 are adapted to respectively display the second part F22 of the second image frame F2 adjacent to the first part F21, and therefore the range of the preferred viewing area can be expanded so that the user in the preferred viewing area does not see the two side edges 213 and 223 adjacent to each other in the frames 212 and 222 of the first display screen 210 and the second display screen 220, and can see the image frames which are spliced completely.

It is to be noted that considering the assembly tolerance problem of the relative positions of the first prismatic structure optical element 230, the first display screen 210 and the second display screen 220, a calibration step may be performed first before performing step S110. In the calibration step, the image processing module 240 drives the first display screen 210 to display a calibration interface (not shown) for the user to define the range of the first block AM11 plus the first sub display area AS1. For example, the calibration interface may be a calibration line displayed on the first display screen 210, and the user can adjust the position of the calibration line while being located directly corresponding to the first display screen 210 and the second display screen 220 and maintaining a proper distance between the first display screen 210 and the second display screen 220. When the calibration line is adjusted to align with the side edge 231 of the first prismatic structure optical element 230 corresponding to the first main display area AM1, this position may be set as the first calibration position. When the calibration line is gradually moved toward the first sub display area AS1 until the calibration line is not visible, this position may be set as the second calibration position. The range between the first calibration position and the second calibration position is the range of the first block AM11 plus the first sub display area AS1.

In addition, the image displayed by the first block AM11 and the first sub display area AS1 has a slight amplification effect in the width direction after passing through the first prismatic structure optical element 230, and therefore in an embodiment, the image displayed by the second block AM12 can be a compressed image without compression in the width direction and the image displayed by the first block AM11 and the first sub display area AS1 is a compressed image compressed in the width direction, so that after being enlarged by the first prismatic structure optical element 230, the image displayed by the first block AM11 and the first sub display area AS1 has the ratio same as the image displayed by the second block AM12 in the width direction. In an embodiment in which the above calibration step is not performed, the image processing module 240 may cause the first block AM11 and the first sub display area AS1 to display the compressed image compressed in the width direction according to a predetermined compression ratio. In an embodiment in which the above calibration step is performed, the compression ratio may be set according to the range of the first block AM11 plus the first sub display area AS1. For example, the compression ratio is W5/La if the width of the first block AM11 plus the first sub display area AS1 is W5, wherein La is the length of the first area R1 in the predetermined direction D2.

The image displayed by the second sub display area AS2 may be an image without compression. In another embodiment, the image displayed by the second sub display area AS2 may further be a compressed image compressed in the width direction, and the compression ratio thereof may be the same as that of the compressed image displayed by the first block AM11 and the first sub display area AS1. In the embodiment where the second sub display area AS2 displays a compressed image, the above calibration step may be further employed to obtain the above-mentioned compression ratio W5/La. Since the width W2 is also determined when the above-described second calibration position is determined, W6×W5/La needs to be equal to W2 if the width of the original image to be displayed in the second sub display area AS2 is W6 (not shown). Therefore, the width W6 of the original image to be displayed in the second sub display area AS2 is W2×La/W5.

Figure 13:
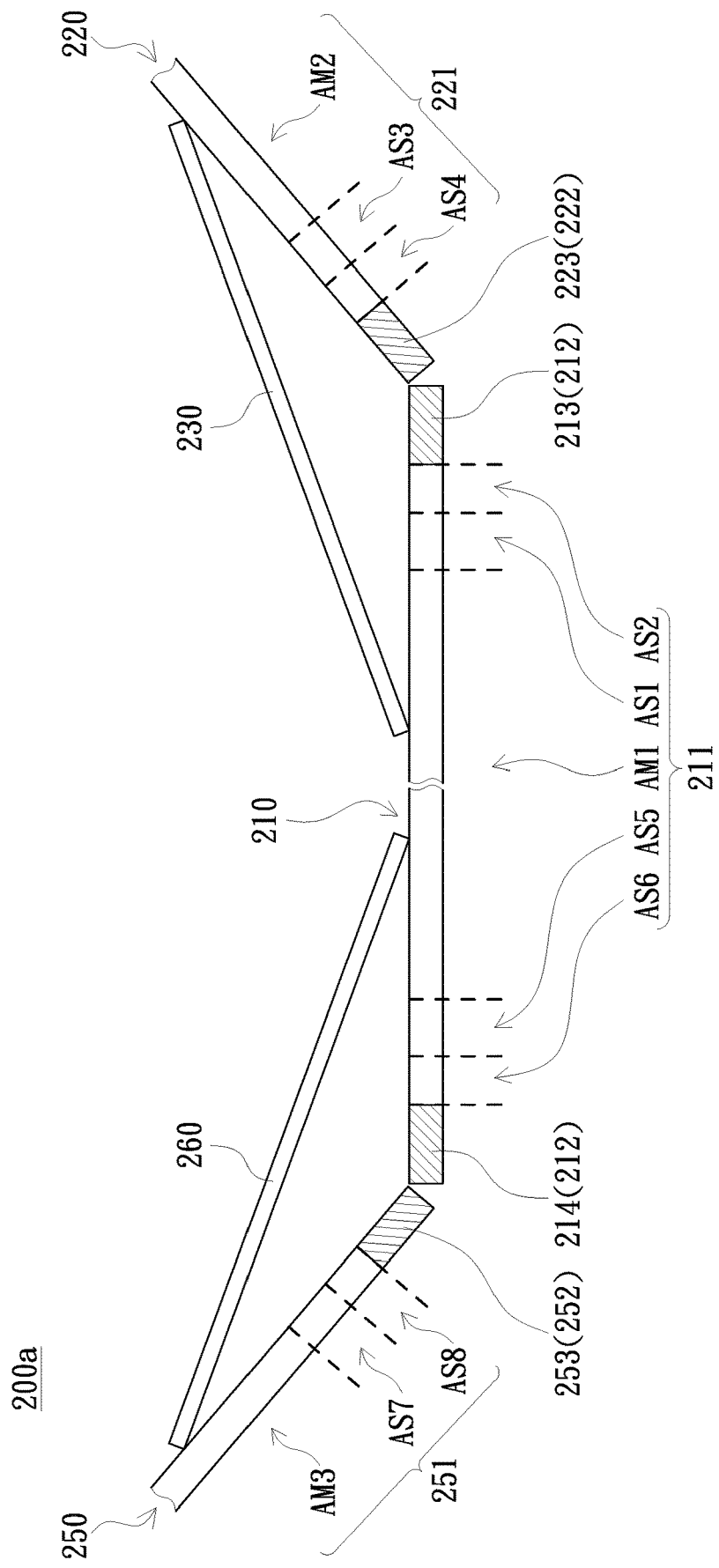
FIG. 13 is a schematic view of a multi-screen display apparatus according to another embodiment of the invention.

Although the embodiment of FIG. 8 is exemplified by including two display screens, the invention does not limit the number of display screens, and more display screens may be spliced as required. FIG. 13 is a schematic view of a multi-screen display apparatus according to another embodiment of the invention. Referring to FIG. 13, the multi-screen display apparatus 200a of the embodiment is similar to the multi-screen display apparatus 200 of FIG. 8. The main difference is that the multi-screen display apparatus 200a further includes a third display screen 250 and a second prismatic structure optical element 260. The third display screen 250 and the first display screen 210 are arranged adjacent to each other. The configuration manner of the first display screen 210, the second display screen 220 and the third display screen 250 is similar to that of the display screens 110a, 110b and 110c in FIG. 1. For example, the second included angle between the first display screen 210 and the third display screen 250 is also similar to the included angle θ1 in FIG. 1. The third display screen 250 also has a display area 251 and a frame 252 surrounding the display area 251. The position where the second prismatic structure optical element 260 is disposed is also similar to that of the prismatic structure optical element 120 in FIG. 1, and no redundant detail is to be given herein. The second prismatic structure optical element 260 has the same structure as the first prismatic structure optical element 230, for example. In addition, the image processing module (not shown) is electrically connected to the first display screen 210, the second display screen 220 and the third display screen 250.

Figure 14:
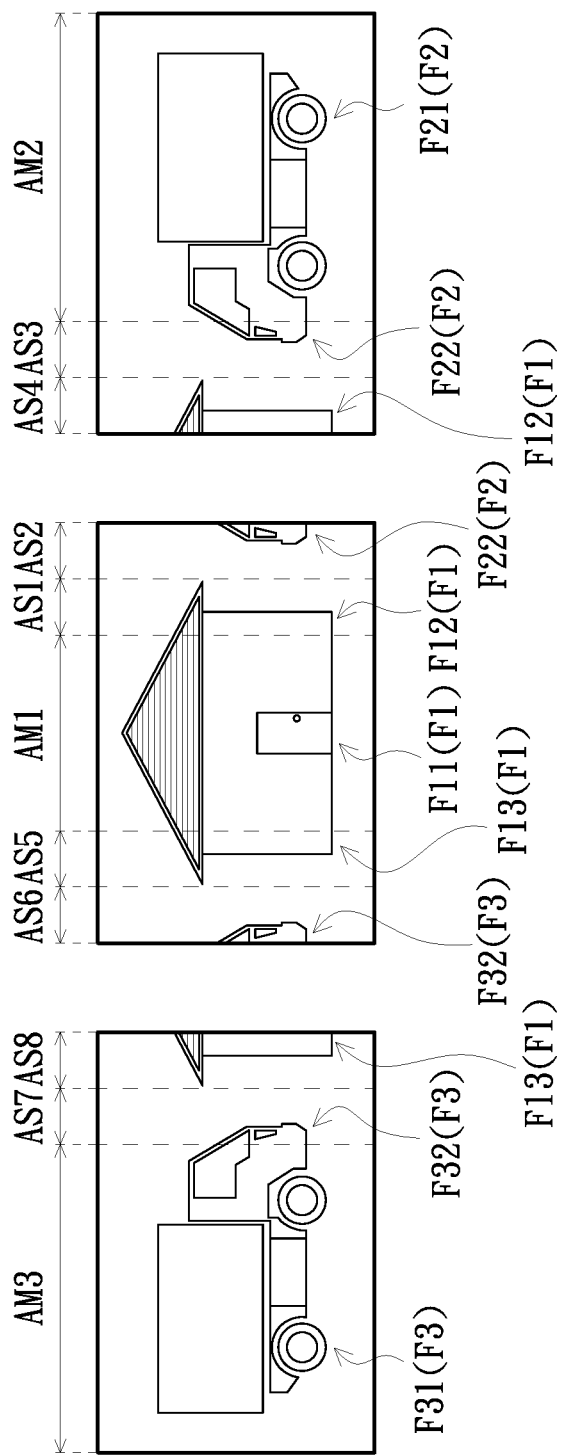
FIG. 14 is a schematic view of the first display screen, the second display screen and the third display screen displaying an image frame in FIG. 13.

FIG. 14 is a schematic view of the first display screen, the second display screen and the third display screen displaying an image frame in FIG. 13. Please refer to FIGS. 13 and 14. In the embodiment, when step S110 of the above display method is performed, the image processing module further divides the display area 211 of the first display screen 210 into a fifth sub display area AS5 and a sixth sub display area AS6 and divides the display area 251 of the third display screen 250 into a sequentially-arranged third main display areas AM3, a seventh sub display area AS7 and an eighth sub display area AS8, wherein the fifth sub display area AS5 is located between the first main display area AM1 and the sixth sub display area AS6, and the eighth sub display area AS8 is adjacent to the sixth sub display area AS6. In addition, when the above step S120 is performed, the image processing module further drives the fifth sub display area AS5 and the eighth sub display area AS8 to respectively display the third part F13 of the first image frame F1 adjacent to the first part F11, drives the third main display area AM3 to display the first part F31 of the third image frame F3, and drives the sixth sub display area AS6 and the seventh sub display area AS7 to respectively display the second part F32 of the third image frame F3 adjacent to the first part F31. It should be noted that the third part F13 and the second part F12 are respectively adjacent to the two sides of the first part F11.

In the embodiment, the principle of the image frame splice of the first display screen 210 and the third display screen 250 is similar to that of the first display screen 210 and the second display screen 220 illustrated in FIGS. 8, 12A and 12B. When the user is located at a preferred viewing position (e.g., a position facing the center of the first display screen 210 and maintaining a predetermined proper distance from the first display screen 210), the direction in which the user views the boundary between the first display screen 210 and the second display screen 220 is substantially as shown in FIG. 8, so that the first image frame F1 and the second image frame F2 that are completely spliced can be seen. Similarly, when viewing the boundary between the first display screen 210 and the third display screen 250, the user can also see the first image frame F1 and the third image frame and F3 that are completely spliced.

When the user moves backward from the preferred viewing position and the distance between the user and the first display screen 210 increases, the direction in which the user views the boundary between the first display screen 210 and the second display screen 220 is substantially as shown in FIG. 12A, so that the first image frame F1 and the second image frame F2 that are completely spliced can be seen. Similarly, when viewing the boundary between the first display screen 210 and the third display screen 250, the user can also see the first image frame F1 and the third image frame F3 that are completely spliced.

When the user moves forward from the preferred viewing position and the distance between the user and the first display screen 210 decreases, the direction in which the user views the boundary between the first display screen 210 and the second display screen 220 is substantially as shown in FIG. 12B, so that the first image frame F1 and the second image frame F2 that are completely spliced can be seen. Similarly, when viewing the boundary between the first display screen 210 and the third display screen 250, the user can also see the first image frame F1 and the third image frame F3 that are completely spliced.

Therefore, the multi-screen display apparatus 200a and the display method of the embodiment can expand the range of the preferred viewing area so that the user in the preferred viewing area does not see the two side edges 213 and 223 adjacent to each other in the frames 212 and 222 of the first display screen 210 and the second display screen 220 and the two side edges 214 and 253 adjacent to each other in the frames 212 and 252 of the first display screen 210 and the third display screen 250, and therefore the completely-spliced image frame can be seen. In addition, the calibration interface and the image compression method described above for the first display screen 210 and the second display screen 220 may also be applied to the first display screen 210 and the third display screen 250.

In summary, in the multi-screen display apparatus and the display method of the invention, the adjacent two display screens each have a sub display area displaying the same image by dividing the display area of each display screen. As such, the range of the preferred viewing area can be expanded so that the user in the preferred viewing area does not see the two side edges adjacent to each other in the frames of the display screens, and only one of the two sub display areas displaying the same image is seen by the user, and therefore the user can see the completely-spliced image frames.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the spirit of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A multi-screen display apparatus, comprising a first display screen, a second display screen and a first prismatic structure optical element, wherein the first display screen and the second display screen are arranged adjacent to each other, a first included angle is formed between the first display screen and the second display screen, the first included angle is greater than 90 degrees and less than 180 degrees, and the first display screen and the second display screen each have a display area and a frame surrounding the display area;

the first prismatic structure optical element is disposed between the first display screen and the second display screen and covers two side edges adjacent to each other in the frames of the first display screen and the second display screen and a part of the display areas, the first prismatic structure optical element comprises a substrate and a plurality of prism pillars adjacent one another disposed on the substrate, and an extending direction of each of the prism pillars is substantially parallel to the two side edges adjacent to each other;

wherein the display area of the first display screen comprises a first main display area, a first sub display area and a second sub display area that are sequentially arranged, the display area of the second display screen comprises a second main display area, a third sub display area and a fourth sub display area that are sequentially arranged, the fourth sub display area is adjacent to the second sub display area, wherein the first sub display area, the second sub display area, the third sub display area and the fourth sub display area are covered by the first prismatic structure optical element, the first main display area is adapted to display a first part of a first image frame, the first sub display area and the fourth sub display area are adapted to respectively display a second part of the first image frame adjacent to the first part, the second main display area is adapted to display a first part of a second image frame, and the second sub display area and the third sub display area are adapted to respectively display a second part of the second image frame adjacent to the first part;

the first main display area comprises a first block and a second block, the first block is covered by the first prismatic structure optical element, the second block is outside the coverage of the first prismatic structure optical element, an image displayed by the second block is a compressed image without compression in a width direction, an image displayed by the first block and the first sub display area is a compressed image compressed in the width direction, so that after being enlarged by the first prismatic structure optical element, the image displayed by the first block and the first sub display area has a ratio same as the image displayed by the second block in the width direction;

an image displayed by the second sub display area is a compressed image compressed in the width direction, and a compression ratio thereof is the same as that of the compressed image displayed by the first block and the first sub display area;

the multi-screen display apparatus further comprises an image processing module for providing a calibration interface displayed on the first display screen for a user to define a range of the first block plus the first sub display area.

2. The multi-screen display apparatus according to claim 1, wherein a width of each of the first sub display area and the second sub display area is less than or equal to a width of ten pixels of the first display screen, and a width of each of the third sub display area and the fourth sub display area is less than or equal to a width of ten pixels of the second display screen.

3. The multi-screen display apparatus according to claim 1, further comprising a third display screen and a second prismatic structure optical element, wherein the third display screen and the first display screen are arranged adjacent to each other, a second included angle is formed between the first display screen and the third display screen, the second included angle is greater than 90 degrees and less than 180 degrees, and the third display screen also has a display area and a frame surrounding the display area;

the second prismatic structure optical element is disposed between the first display screen and the third display screen and covers two side edges adjacent to each other in the frames of the first display screen and the third display screen and a part of the display areas, the second prismatic structure optical element and the first prismatic structure optical element have the same structure, wherein the display area of the first display screen further comprises a fifth sub display area and a sixth sub display area, the fifth sub display area is located between the first main display area and the sixth sub display area, the display area of the third display screen comprises a third main display area, a seventh sub display area and an eighth sub display area that are sequentially arranged, the eighth sub display area is adjacent to the sixth sub display area, wherein the fifth sub display area, the sixth sub display area, the seventh sub display area and the eighth sub display area are covered by the second prismatic structure optical element, the fifth sub display area and the eighth sub display area are adapted to respectively display a third part of the first image frame adjacent to the first part, the third main display area is adapted to display a first part of a third image frame, and the sixth sub display area and the seventh sub display area are adapted to respectively display a second part of the third image frame adjacent to the first part.

4. A display method for a multi-screen display apparatus, the multi-screen display apparatus comprising a first display screen and a second display screen, and the display method comprising:

dividing a display area of the first display screen into a first main display area, a first sub display area and a second sub display area that are sequentially arranged and dividing a display area of the second display screen into a second main display area, a third sub display area and a fourth sub display area that are sequentially arranged, wherein the fourth sub display area is adjacent to the second sub display area; and driving the first main display area to display a first part of a first image frame, driving the first sub display area and the fourth sub display area to respectively display a second part of the first image frame adjacent to the first part, driving the second main display area to display a first part of a second image frame, and driving the second sub display area and the third sub display area to respectively display a second part of the second image frame adjacent to the first part;

wherein the first main display area comprises a first block and a second block, the first block is adjacent to the first sub display area, an image displayed by the second block is a compressed image without compression in a width direction, and an image displayed by the first block and the first sub display area is a compressed image compressed in the width direction;

wherein an image displayed by the second sub display area is a compressed image compressed in the width direction, and a compression ratio thereof is the same as that of the compressed image displayed by the first block and the first sub display area;

wherein the display method further comprises:

driving the first display screen to display a calibration interface for a user to define a range of the first block plus the first sub display area.

5. The display method according to claim 4, wherein the multi-screen display further comprises a third display screen, and the display method further comprises:

dividing the display area of the first display screen into a fifth sub display area and a sixth sub display area and dividing a display area of the third display screen into a third main display area, a seventh sub display area and an eighth sub display area that are sequentially arranged, wherein the fifth sub display area is located between the first main display area and the sixth sub display area, and the eighth sub display area is adjacent to the sixth sub display area; and driving the fifth sub display area and the eighth sub display area to respectively display a third part of the first image frame adjacent to the first part, driving the third main display area to display a first part of a third image frame, and driving the sixth sub display area and the seventh sub display area to respectively display a second part of the third image frame adjacent to the first part.

* * * * *